(12) United States Patent
Erickson et al.

(10) Patent No.: US 6,721,776 B1
(45) Date of Patent: *Apr. 13, 2004

(54) GENERIC DCOM SERVER

(75) Inventors: Joey L. Erickson, New Brighton, MN (US); Scott L. Rappa, White Bear Lake, MN (US); Daniel P. Starkovich, Brooklyn Park, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/310,717

(22) Filed: May 12, 1999

(51) Int. Cl.[7] .................................................. G06F 9/44
(52) U.S. Cl. ...................... 709/101; 709/316; 709/203; 717/102
(58) Field of Search ................................ 709/101, 203, 709/310–320; 707/102; 717/102

(56) References Cited

U.S. PATENT DOCUMENTS 6,212,546 B1 * 4/2001 Starkovich .................. 709/203
6,321,251 B1 * 11/2001 Deisinger et al. ........... 709/203
6,397,220 B1 * 5/2002 Deisinger et al. ........... 707/102

* cited by examiner

Primary Examiner—St. John Courtenay, III
(74) Attorney, Agent, or Firm—Charles A. Johnson; Mark T. Starr; Nawrocki, Rooney & Sivertson, PA

(57) ABSTRACT

A generic server and gateway that run within a Distributed Component Object Model (DCOM) environment capable of receiving requests from one or more different types of DCOM clients for service by an On-Line Transaction Processing (OLTP) style application running on an enterprise server. The services on the OLTP system are designed to accomplish a specific task, for example, update a user's bank account balance following a debit or credit. In a preferred embodiment, the OLTP system is X/Open compliant. The DCOM Client can be any type of client, including a Visual Basic client, C++ client, or a Web Browser with Active Server Pages (ASP). The generic server and generic gateway are vendor supplied components which tend to insulate the client developer from the details of the communication protocol with the OLTP system.

20 Claims, 8 Drawing Sheets

GENERIC DCOM SERVER

CROSS REFERENCE TO CO-PENDING APPLICATIONS

The present application is related to U.S. patent application Ser. No. 09/164,908, filed Oct. 1, 1998, now U.S. Pat. No. 6,324,681 B1, entitled "AN AUTOMATED DEVELOPMENT SYSTEM FOR DEVELOPING APPLICATIONS THAT INTERFACE WITH BOTH DISTRIBUTED COMPONENT OBJECT MODEL (DCOM) AND ENTERPRISE SERVER ENVIRONMENTS"; U.S. patent application Ser. No. 09/164,759, filed Oct. 1, 1998, now U.S. Pat. No. 6,397,220, entitled "A COMMON GATEWAY WHICH ALLOWS APPLETS TO MAKE PROGRAM CALLS TO OLTP APPLICATIONS EXECUTING ON AN ENTERPRISE SERVER"; U.S. patent application Ser. No. 09/310,718, filed May 12, 1999, entitled "DCOM OBJECT CONTROL CREATOR", and U.S. patent application Ser. No. 09/164,932, filed Oct. 1, 1998, entitled "A MULTI-CLIENT USER CUSTOMIZED DCOM GATEWAY FOR AN OLTP ENTERPRISE SERVER APPLICATION assigned to the assignee of the present invention and incorporated herein by reference.

BACKGROUND OF THE INVENTION

1. Field of the Invention

The present invention relates to a communication gateway for providing access to an enterprise server application from a Distributed Component Object Model (DCOM) environment, and more specifically, to a system in which a developer creates a DCOM client which communicates through a standardized DCOM server and generic gateway to an On-Line Transaction Processing (OLTP) Enterprise Server Application.

2. Description of the Prior Art

The methods by which companies conduct business with their customers are undergoing fundamental changes, due in large part to World Wide Web technology. In addition, the same technology that makes a company accessible to the world, may be used on internal company networks for conducting operational and administrative tasks.

One of the technologies underlying the World Wide Web is the prospect of using component software technology—the idea of breaking large, complex software applications into a series of pre-built and easily developed, understood, and changed software modules called components—as a means to deliver software solutions much more quickly and at a lower cost (source: DCOM: A Business Overview, online at http://www.microsoft.com/ntserver/guide/dcom.asp). The goal is to achieve economies of scale for software deployment across the industry.

A component architecture for building software applications will enable this by: 1) speeding development—enabling programmers to build solutions faster by assembling software from pre-built parts; 2) lowering integration costs—providing a common set of interfaces for software programs from different vendors means less custom work is required to integrate components into complete solutions; 3) improving deployment flexibility—making it easier to customize a software solution for different areas of a company by simply changing some of the components in the overall application; and 4) lowering maintenance costs—isolating software function into discreet components provides a low-cost, efficient mechanism to upgrade a component without having to retrofit the entire application.

A distributed component architecture applies these benefits across a broader scale of multiuser applications. The Distributed Component Object Model (DCOM), developed by Microsoft Corporation, has several strengths that make it a key technology for achieving this. Because it is an ActiveX technology, DCOM works natively with Internet technologies like TCP/IP, the Java language, and the HTTP network protocol, providing "object glue" that will enable business applications to work across the Web. DCOM is also an open technology that runs on multiple platforms.

DCOM has its roots in Microsoft's object technology, which has evolved over the last decade from DDE (Dynamic Data Exchange, a form of messaging between Windows programs), OLE (Object Linking and Embedding, embedding visual links between programs within an application), COM (the Component Object Model, used as the basis for all object binding), and ActiveX (COM enabled for the Internet). As stated earlier, applications built from components are simply easier to debug and evolve than large, monolithic applications.

The logical boundary for component applications is no longer on a single machine. Businesses want to leverage the benefits of component development across a broader set of shared applications that operate on multiple machines. These types of applications are referred to as "three-tier" or "n-tier" applications, where "tiers" of application logic, presentation services, business services, and information retrieval and management services, are broken into different components that can communicate directly with each other across a network. To the end user, these applications appear as a seamless extension of their existing desktop environment.

The simplicity, ubiquity, and industry momentum of standard Internet protocols like HTTP make it an ideal technology for linking components together for applications that span machine boundaries. HTTP is easy to program, is inherently cross-platform, and supports an accessible, universal naming service. Much of the excitement around the Java language derives from its potential as a mechanism to build distributed component applications on the Internet. In addition to Java support, DCOM enables components written in other languages, including C, COBOL, Basic, and Pascal, to communicate over the Internet, providing a growth path for existing applications to support Web technology.

As distributed component architectures, such as DCOM, are making their mark as a technology that enables software components to communicate directly with each other across networks, many businesses have a wealth of information that is managed by prior art data base management systems such as DMS, RDMS, DB2, Oracle, Ingres, Sybase, Informix, and many others. In addition, many of the database management systems are available as resources in a larger transaction processing system.

One key to the future success of a business may lie in its ability to capitalize on the ability to interconnect a distributed component architecture, such as DCOM, with existing enterprise On-Line Transaction Processing (OLTP) systems. It defeats the two main goals of component-based development, fast time-to-market and lower development costs, if companies are forced to "hand code" into their component applications the mission critical services that are required for online production systems.

One method of affecting the desired communication involves development of a unique DCOM server in accordance with the transaction to be executed. This unique DCOM server permits the developer to generate a DCOM client which can communicate through the unique DCOM server to the OLTP platform. A gateway hosted by the OLTP platform interfaces the unique DCOM server to the OLTP system.

SUMMARY OF THE INVENTION

The present invention overcomes many of the disadvantages associated with the prior art by providing a generic interface mechanism whereby a remote client residing within a Distributed Component Object Model (DCOM) environment calls services on an enterprise On-Line Transaction Processing (OLTP) system. Thus, the present invention "marries" the DCOM client architecture and the transactional client/server architecture by providing a generic DCOM server operating within the DCOM environment which communicates through a gateway to the OLTP platform. The services on the OLTP system are designed to accomplish a specific task, for example, update a user's bank account balance following a debit or credit. In a preferred embodiment, the OLTP system is X/Open compliant. The DCOM Client can be any type of client, including a Visual Basic client, C++ client, or a Web Browser with Active Server Pages (ASP).

A DCOM Client Application is provided visibility to available services on an enterprise OLTP system such as the Unisys 2200 because the Application is linked to a library built from an Enterprise OLTP service view file. This view file defines what input parameters will be provided to the OLTP service and the size and type of each input parameter. If the Enterprise OLTP service is to provide output back to DCOM Client Application, the output view file definition is provided.

When an OLTP request is issued from a DCOM Client, the DCOM Client Application first builds a buffer containing the service call and the appropriate set of input parameters, then passes this information to the generic DCOM Server of the present invention. The DCOM Server receives the service calls from the DCOM Client Application, builds an input buffer from the input parameters, and passes the information to the gateway via a standard pipe. The gateway receives the input buffer from the generic DCOM Server by listening to the pipe. The gateway then forwards the input buffer to the communications program, which in a preferred embodiment is the Open/OLTP HTP:c program. Finally, the communications program passes the input buffer to the enterprise node for processing by the requested service.

After the OLTP system services the request, a response is passed back via an output buffer to the gateway, which returns this buffer to the generic DCOM Server. The Generic DCOM Server then unpacks the output buffer into individual output parameters, and returns the parameters to the DCOM Client application.

It is most important that in accordance with the present invention, the Generic DCOM Server and the DCOM Gateway are completely provided to the DCOM client developer by the system vendor. Thus, the client developer is able to generate a complete DCOM client, calling upon the substantial capabilities and services of the OLTP system, without the necessity of interacting in a developmental way with the DCOM communications protocol. The client developer in essence performs the entire developmental task within the DCOM environment. The Generic DCOM Server and DCOM Gateway are supplied to insulate the client developer from the details of the communication interface between the DCOM terminal and the OLTP host platform.

The present invention shortens application development time by permitting the developer to concentrate only upon client development without concern for generation of a unique DCOM server for each client. Furthermore, because the developer is insulated from the DCOM communications protocol, the development can be accomplished using a high level, commonly available development tool, such as Visual Basic. The DCOM system, such as NT, experiences greater reliability and maintainability, because a single generic server and gateway are substituted for potentially unique servers and gateways for each client application.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be kept in mind the distinction between the method operations in operating a computer and the method of computation itself. The present invention related to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms present herein are not inherently related to a particular computer system or other apparatus. In particular, various general purpose computer systems may be used with computer programs written in accordance with the teachings of the present invention, or it may prove more convenient to construct more specialized apparatus, to perform the required method steps. The required structure for such machines will be apparent from the description given below.

Figure 1:
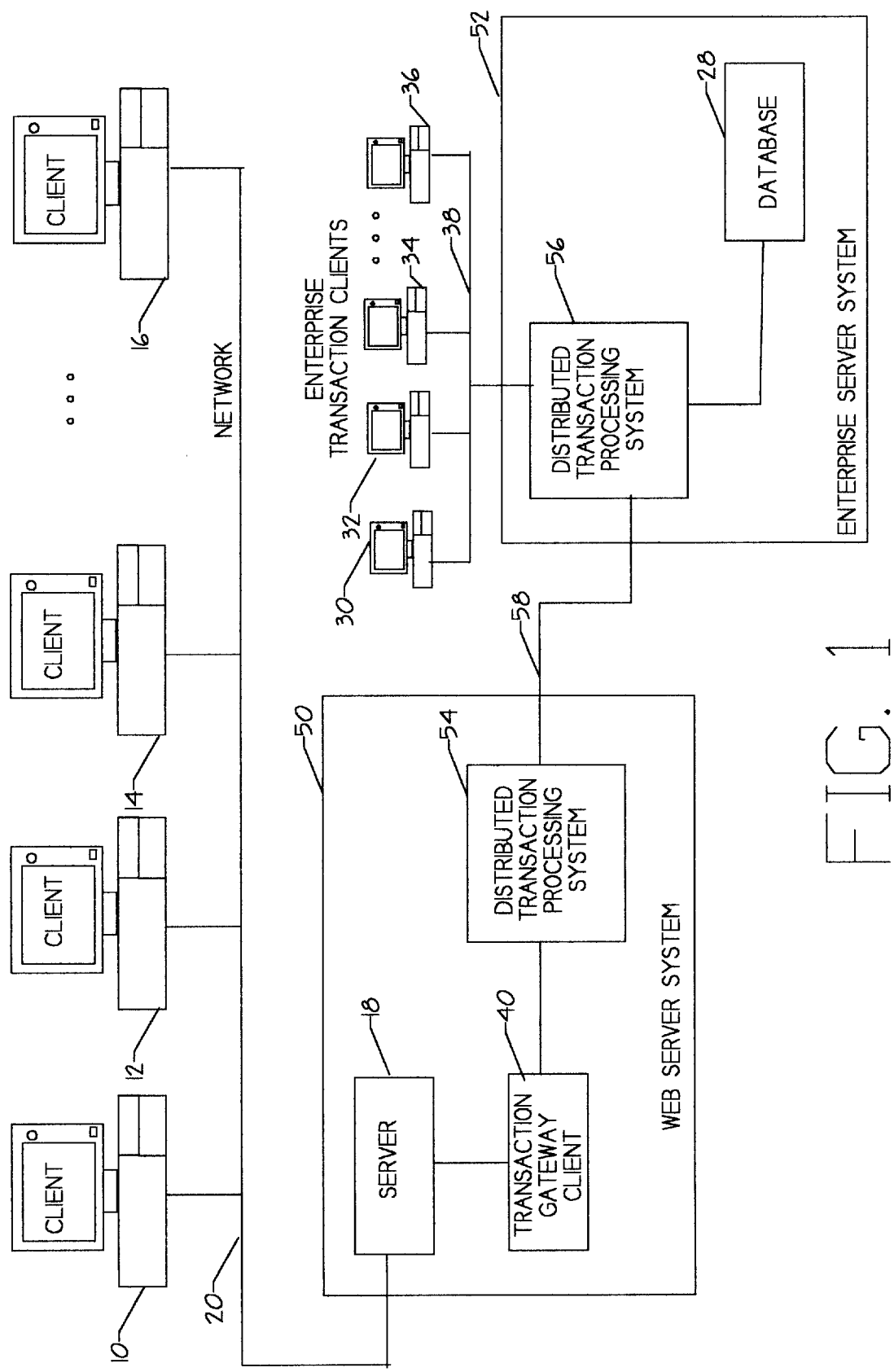
FIG. 1 is a functional block diagram of an exemplary computing environment in which the present invention could be used to make an enterprise based transaction processing system interoperable with a PC/Workstation based requestor.

FIG. 1 is a functional block diagram of an exemplary computing environment in which the present invention could be used to make an enterprise based transaction processing system interoperable with a PC/Workstation based requestor. A plurality of PC/Workstations, designated as Clients 10, 12, 14 and 16 are coupled to a Server 18 via Network 20. The Network 20 may be an internal local area network or the Internet.

Each of the Clients 10, 12, 14 and 16, is a Personal Computer/Workstation having operating system software and application software designed to provide Graphical User Interface (GUI) and communications capabilities which enable the Client to communicate with an associated Server application 18 via a Network 20.

The Workstation Server System 50 may be any class of machine(s) which are capable of running a Server application 18 along with a Distributed Transaction Processor 54. The Transaction Processing system 54 is designated as Distributed to make clear that a transaction is formatted on the Workstation Server System 50 and forwarded to the Enterprise Server system 52 for processing.

The exemplary Enterprise Server System 52 is a 2200 Series data processing system from Unisys and also includes a Distributed Transaction Processing System 56. The Distributed Transaction Processing System 56 is intended to encompass the same functionality as a monolithic transaction processing system, however, it is designated as Distributed to be compatible with the Distributed Transaction Processing System 54. The exemplary Distributed Transaction Processing Systems 54 and 56 are intended to encompass transaction manager software, such as Open/OLTP Transaction Manager software from Unisys, and user implemented Open/OLTP services. The Distributed Transaction Processing System 54 and the Distributed Transaction Processing System 56 are coupled via Network 58. Preferably, the network interface for Network 58 is separate from the network interface for Network 20.

The Distributed Transaction Processing System 56 serves data from the Database 28 to the Transaction Clients 30, 32, 34 and 36. The Transaction Clients 30, 32, 34 and 36 are coupled to the Distributed Transaction Processing System 56 via line 38, of which the underlying technology is driven by the application of the Distributed Transaction Processing System 56.

The Transaction Gateway Client 40 allows the Server 18 to interoperate with the Transaction Processing System. When a Client 10, 12, 14 or 16 selects an enterprise based service, the request is routed to the Server 18, which in turn routes the request to the Transaction Gateway Client 40. The Transaction Gateway Client 40 determines the requested service and forwards the necessary information to the Distributed Transaction Processing System 54 and 56. The Distributed Transaction Processing System 54 and 56 processes the request against the Database 28 according to the specified request (e.g., select, update, delete). The Distributed Transaction Processing System 54 and 56 returns data and/or status information to the Transaction Gateway Client 40, which in turn formats the data in an appropriate manner for the Server 18. The Server 18 then returns the information to the requesting Client 10, 12, 14 and 16.

Figure 2A:
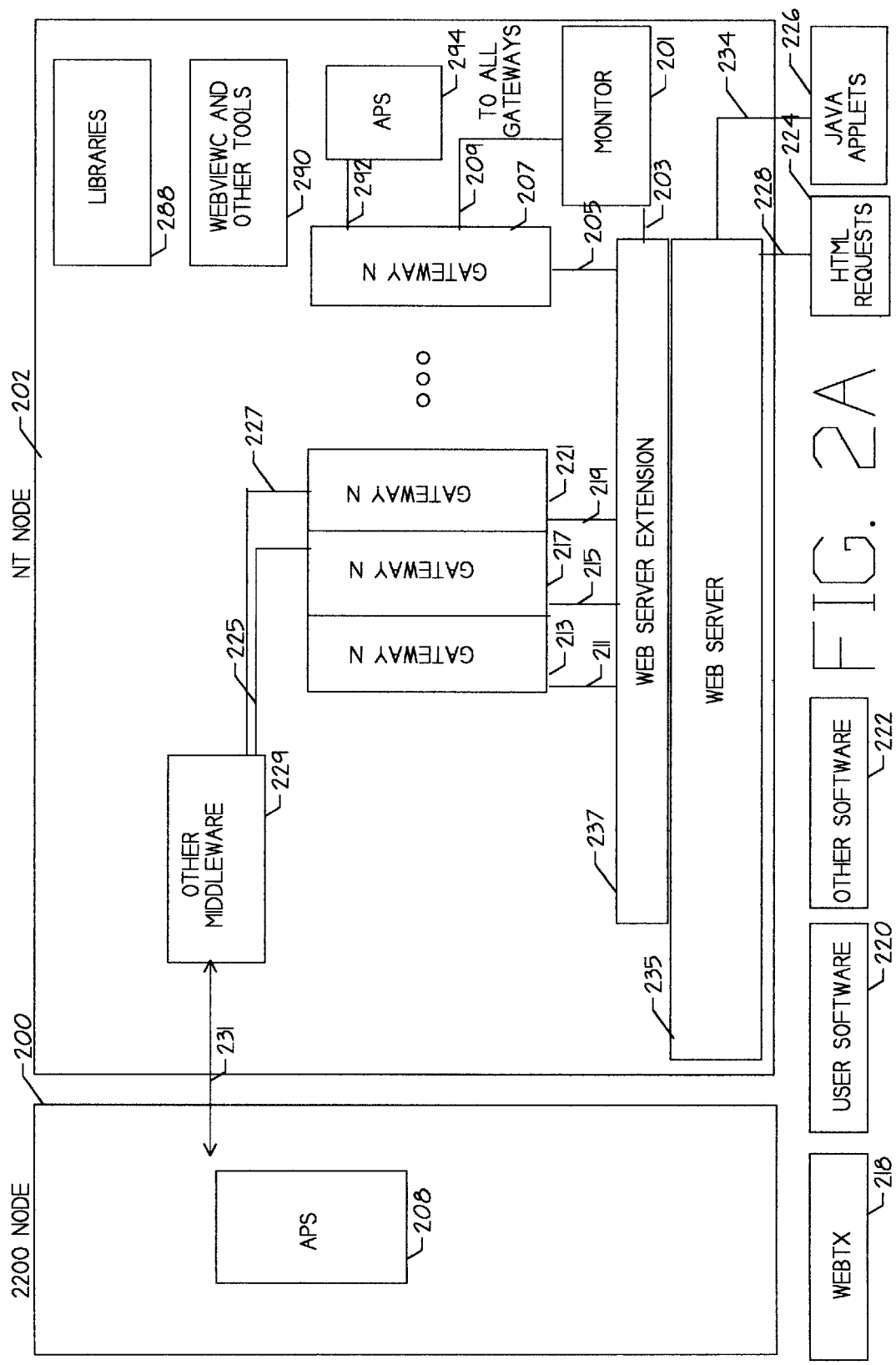
FIG. 2A is a functional block diagram of a generalized WebTx environment.

FIG. 2A is a functional block diagram of a generalized WebTx environment. In general, WebTx is middleware in a client/server computing environment which accepts requests from the client side and routes the requests to the correct place on the server side, then passes a response from the server side back to the client side. In the context of the present invention, WebTx "marries" a Microsoft DCOM client/server architecture (such as the NT node shown in 202) with a transactional client/server architecture (such as the Unisys 2200 enterprise node, as shown at 200).

The WebTx environment, as utilized in the present invention, is comprised of several components, including a Monitor 201, a Web Server Extension 237, one or more Gateways 213, 217, 221, and 207, the WebViewC compiler 290, and a set of libraries 288.

The WebTx Monitor 201 communicates with the Web Server Extension 237 via interface 203, and a Gateway 207 via interface 209. The Monitor 201 functions as the WebTx administrative tool. One function of the Monitor 201 is to start and stop the gateways 207, 213, 217, and 221, as needed. Within a Unix environment, the WebTx monitor module is known as WebMon, while under the Windows NT environment, the WebTx monitor module is known as WtxSvc.

The WebTx Web Server Extension component 237, is a run-time extension of the Web Server 235 (such as Netscape FastTrack, Netscape Enterprise, or Microsoft IIS). The function of the Web Server Extension 237 is to intercept requests intended for WebTx 218, and instead route the requests to the Gateways 207, 213, 217, and 221. The Web Server Extension 237 will also interpret the response from the Gateways, and route the reply. The Web Server Extension is connected to the Gateways 213, 217, 221 and 207 via interfaces 211, 215, 219 and 205. The Web Server Extension is connected to the Monitor 201 via interface 203, an HTML requestor component 224 via interface 228, and a Java Applet 226 via interface 234.

The Gateways 213, 217, 221 and 207 perform tasks which are grouped into conceptual areas. The Gateways 213, 217, 221 and 207 receive requests from the Web Server Extension 237 or from the Applications 212 and take whatever action is necessary to fulfill the request. This typically involves transforming a request (such as a URL from a Web Browser or remote procedure calls RPC's from a DCOM client) into a format which is understandable by a Distributed Transaction Processing System such as a Unisys 2200 Enterprise System 200. The Gateways 213, 217, 221 and 207 also transform data returned from the Distributed Transaction Processing System 200 into a formatted response which is returned to the requestor.

The WebViewC compiler 290 is used in conjunction with specific Gateway implementations, such as ViewGate, TUXGate, and JGate. The WebViewC compiler 290 compiles Open/OLTP view files generated on the OLTP enterprise system to create WebTx view files (.wv) and HTML files (.html). The WebViewC compiler is a free-standing component with no direct communication to any of the other components within the WebTx environment.

Other WebTx Components include libraries 288 such as the Software Development Kit (SDK) libraries, which provide framework and functions for building Custom Gateways. The SDK is specifically designed to allow customers to build their own gateways. Another type of library present within the WebTx system are Java Class Libraries, which provide class definitions for building JavaGate compatible applets.

Another tool 290 that may exist as a WebTx component is DGateAce. DGateAce is analogous to WebViewC, and is used specifically in conjunction with DGate, as part of the Unisys Pathmate system. DGateAce is further described in a co-pending application entitled, "AN AUTOMATED DEVELOPMENT SYSTEM FOR DEVELOPING APPLICATIONS THAT INTERFACE WITH BOTH DISTRIBUTED COMPONENT OBJECT MODEL (DCOM) AND ENTERPRISE SERVER ENVIRONMENTS".

Unix WebTx uses Inter-Process Communications (IPC) objects such as semaphores, shared memory, message queues and signals, while NT WebTx uses IPC objects such as handles, pipes, mutexes, and events.

Figure 2B:
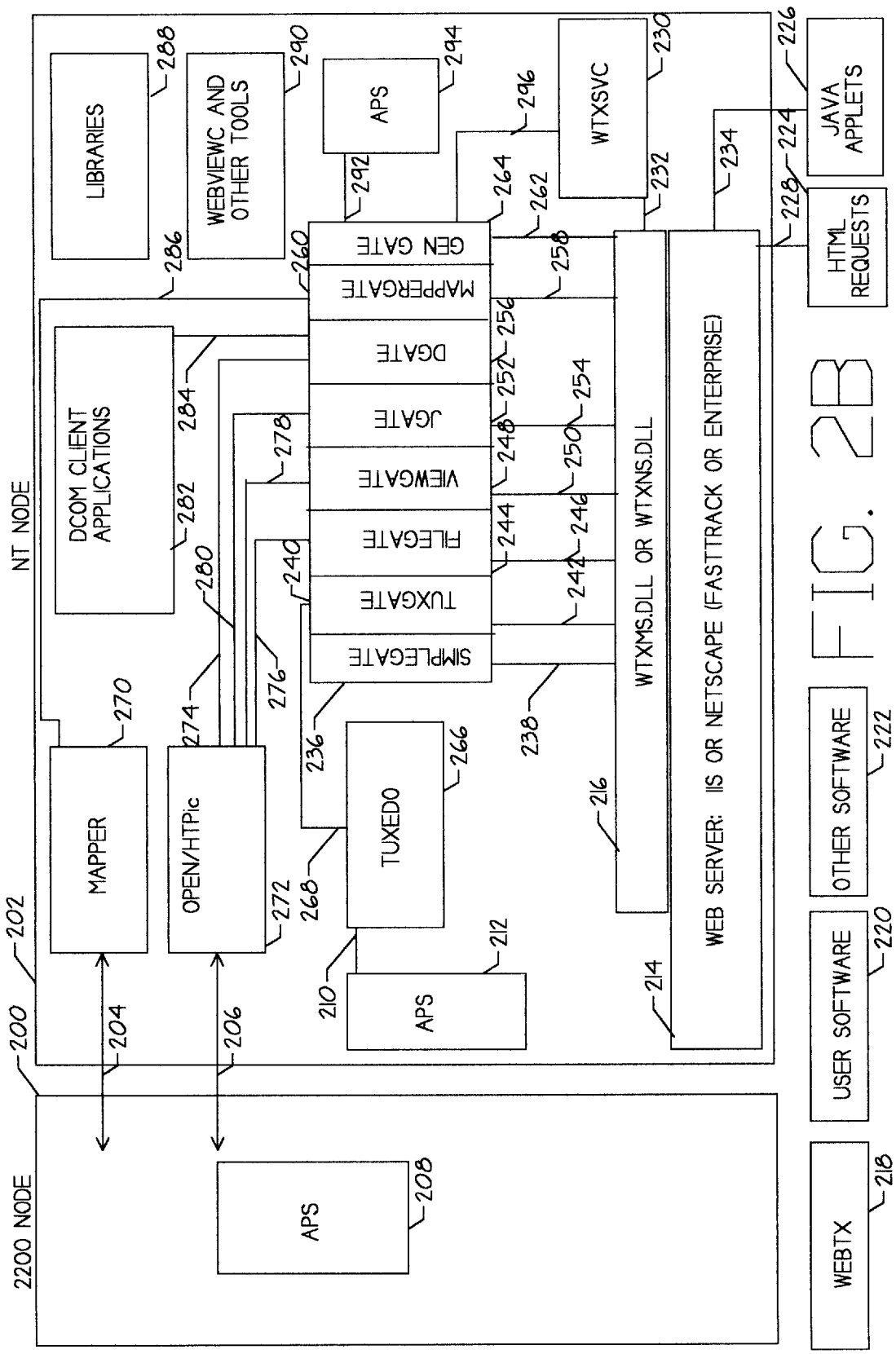
FIG. 2B is a functional block diagram of WebTx components utilized within a Microsoft NT environment.

FIG. 2B is a functional block diagram of WebTx components utilized within a Microsoft NT environment. This figure shows specific Gateway implementations within the Windows NT node. The SimpleGate Gateway 236 is specifically utilized as a test tool. It merely echoes a request. The TUXGate Gateway 240 provides generalized access to OLTP services through BEA TUXEDO 266. BEA TUXEDO acts as the hub for a distributed enterprise and Internet 3-tier applications. It provides an open environment that supports a wide variety of clients, databases, networks, legacy systems, and communications options. The FileGate Gateway 244 works in conjunction with a specific OLTP service to access textual files on the Unisys 2200 node. ViewGate 248 provides generalized access to OLTP services on the Unisys 2200 node (specifically HTML output). JGate 252 provides generalized Java applet access to OLTP services on the Unisys 2200 node. The DGate Gateway 256 provides generalized DCOM access to OLTP services on the Unisys 2200 node. The MapperGate Gateway 260 provides generalized access to Mapper applications within the Microsoft Windows NT environment. The Generic DCOM Server of the present invention, in combination with the gate, provides a standardized way for a customer to communicate between a customer client application and the OLTP enterprise application.

Figure 3:
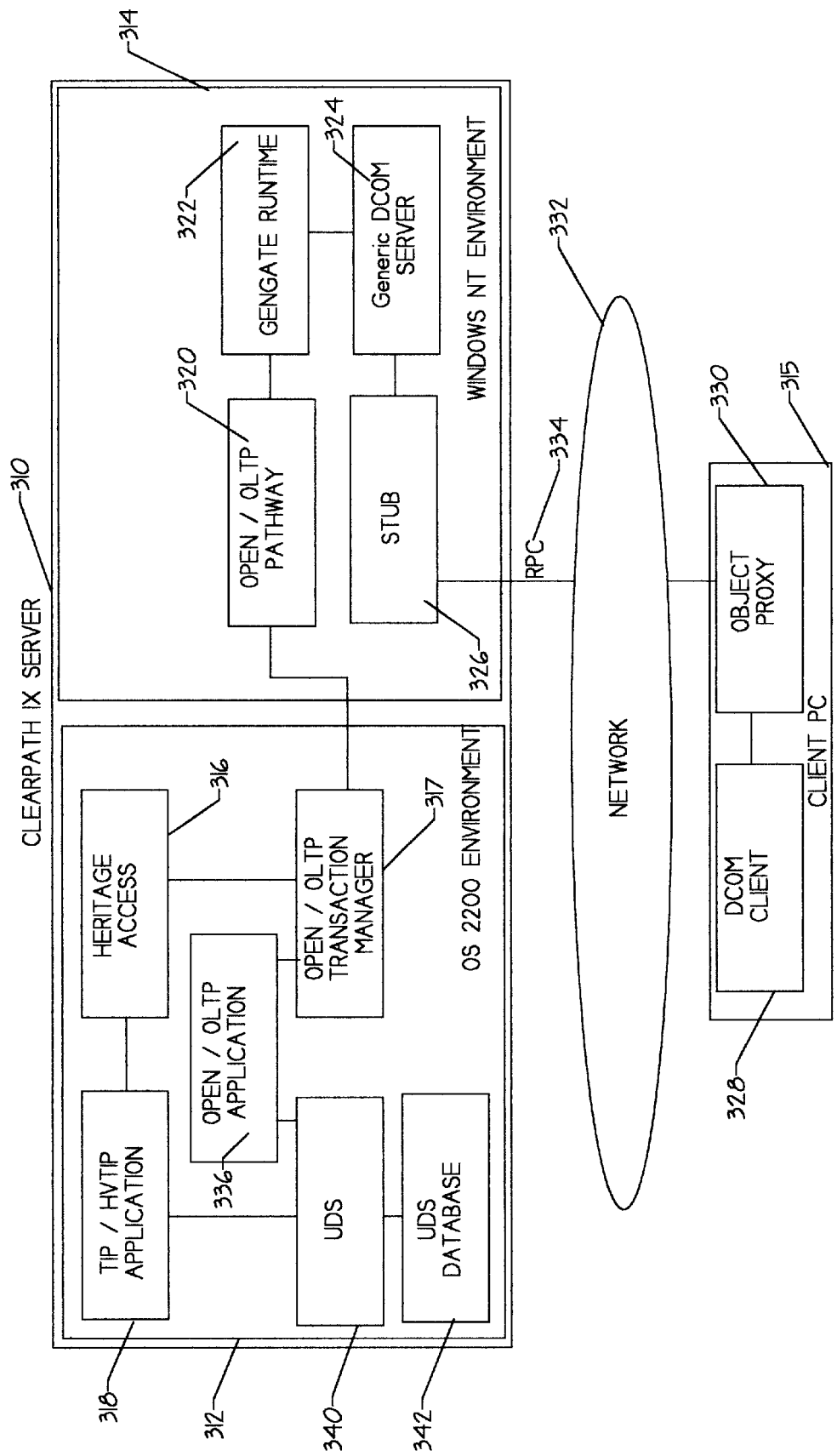
FIG. 3 is a diagram showing the relationship of the key software components of the present invention which allow DCOM clients to access enterprise applications.

FIG. 3 is a diagram showing the relationship of the key software components of the present invention which allow DCOM clients to access enterprise applications. The Unisys ClearPath IX Server 310 includes both an OS 2200 environment 312 and a Windows NT environment 314. All ClearPath HMP IX Servers 310 include On-Line Transaction Processing (OLTP) software that complies with the X/Open model for Distributed Transaction Processing (DTP). This enables client/server access to existing OLTP applications as well as allowing development of new, distributed client/server applications.

The X/Open DTP software provided for the OS 2200 environment 312 is TransIT Open/OLTP, available commercially from Unisys Corporation. The TransIT Open/OLTP Transaction Manager 317 is the base product for all Open/OLTP software in the OS 2200 environment 312. It includes: 1) a transaction monitor, which executes and routes transactions, performs load balancing, and recovers transactions after failures and 2) A communications resource manager (CRM), which controls communications among distributed applications.

The Open/OLTP Transaction Manager 317 includes interfaces to applications and to database systems (resource managers), including the Database Management System (DMS) and the Relational Database Management System (RDMS).

The OS2200 Environment also includes an Open/OLTP Heritage Application Access component 316. This component 316 allows use of existing OS 2200 OLTP applications, many without modification, as Open/OLTP server programs. This provides an easy way to provide GUI client/server access to existing applications. These Open/OLTP server programs can be Transaction Processing (TIP), High Volume Transaction Processing (HVTIP) or other online batch programs (as shown at 318). Tools are provided for formatting the data from the existing program into Open/OLTP buffer formats.

When used with Open/OLTP, the present invention makes it possible to provide access to the following types of OS 2200 applications from a DCOM environment: 1) Native Open/OLTP applications (local), 2) native Open/OLTP applications that participate in distributed transactions with other platforms running Open/OLTP and BEA TUXEDO software, and 3) Heritage applications that use TIP, HVTIP, and DPS.

Existing transactions can be reused without modification, as long as they meet the following criteria: 1) Open/OLTP services must use the request/response model. Conversational services are not supported, and 2) Open/OLTP services must use X_C_TYPE or X_COMMON buffers. X_OCTET buffers are not supported.

The key software components that enable DCOM clients to access Open/OLTP applications reside in the Windows NT environment 314 of the ClearPath IX server 310. The Open/OLTP HTP:c software component 320 is middleware which enables applications in the Windows NT environment to execute transactions against OS 2200 applications that use the Open/OLTP transaction manager 317. The GDGate runtime software component 322 (GDGate.exe) acts as a conduit between the Windows NT DCOM environment 314 and the Open/OLTP environment 312. The Generic DCOM Server software component 324 accepts requests from DCOM Clients, repackages the parameters into the format required by the Open/OLTP transaction manager 317, and then forwards the parameters over a named pipe to the GDGate runtime 322. The stub software component 326 accepts remote procedure calls from object proxies on client PCs and converts them to interface calls to the Generic DCOM Server application 324.

DCOM Client components 328 reside in a Windows 95 or Windows NT Workstation environment on a personal computer 315. The DCOM Client program 328 provides a graphical user interface (GUI) for submitting transaction requests to the Generic DCOM Server 324 and viewing the data it returns. The Object Proxy software component 330 converts requests from the DCOM client 328 to remote procedure calls (RPC) 334. The RPCs 334 are subsequently sent across a network 332 to the stub component 326 in the Windows NT environment 314.

The primary new components of the present invention are GDGate runtime components 322 and Generic DCOM Server 324. Because these are vendor supplied components, the developer need only be concerned with developing the DCOM Client (client).

Figure 4:
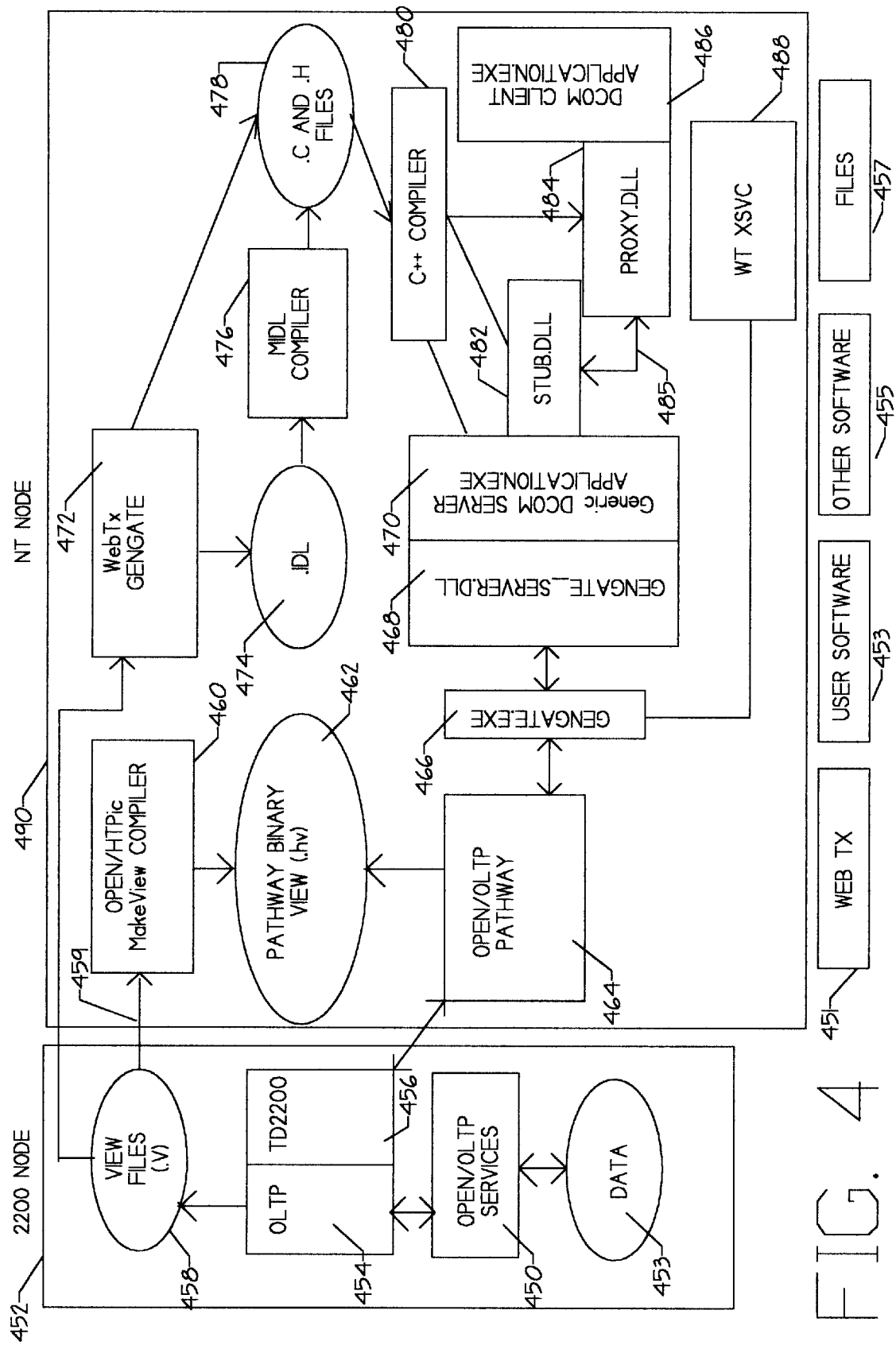
FIG. 4 is an illustration of the environment within which the present invention operates.

FIG. 4 is an illustration of the environment within which the present invention operates. Open/OLTP services 450 are created by a user on an enterprise server 452, such as a Unisys 2200. These services 450 are capable of operating under an OLTP-style transaction processing system. In a preferred embodiment, this OLTP-style system is X/Open compliant. The service 450 is designed to accomplish a specific task, for example, update a user's bank account balance following a debit or credit.

Each service is associated with an input view (.V) file 458 which defines how the input parameters will be provided to the service 450. In particular, the .V file 458 indicates where each input parameter is located in the view file, and the size and type of each input parameter. If a service 450 is to provide output to the user (for example, the updated account balance), another output view file is required to communicate how the information will be presented within the output view buffer.

For all services 450 that are to be accessed from a particular Windows NT node 490, the associated view files 458 must be copied (via FTP or other copy service, shown at 459) to that node 490. Once the view files 458 have been successfully copied to the Windows Nt node 490, the MakeView compiler 460 is used to generate ".hv" files 462.

The GDGate software component 472 also must have access to the view files 458. GDGate software component 472 uses the .wv files 474 created by the WebViewC compiler (not shown in this figure) at run time to package the view data correctly. The run time functions are described in greater detail below. The remainder of the referenced components are as described.

Figure 5:
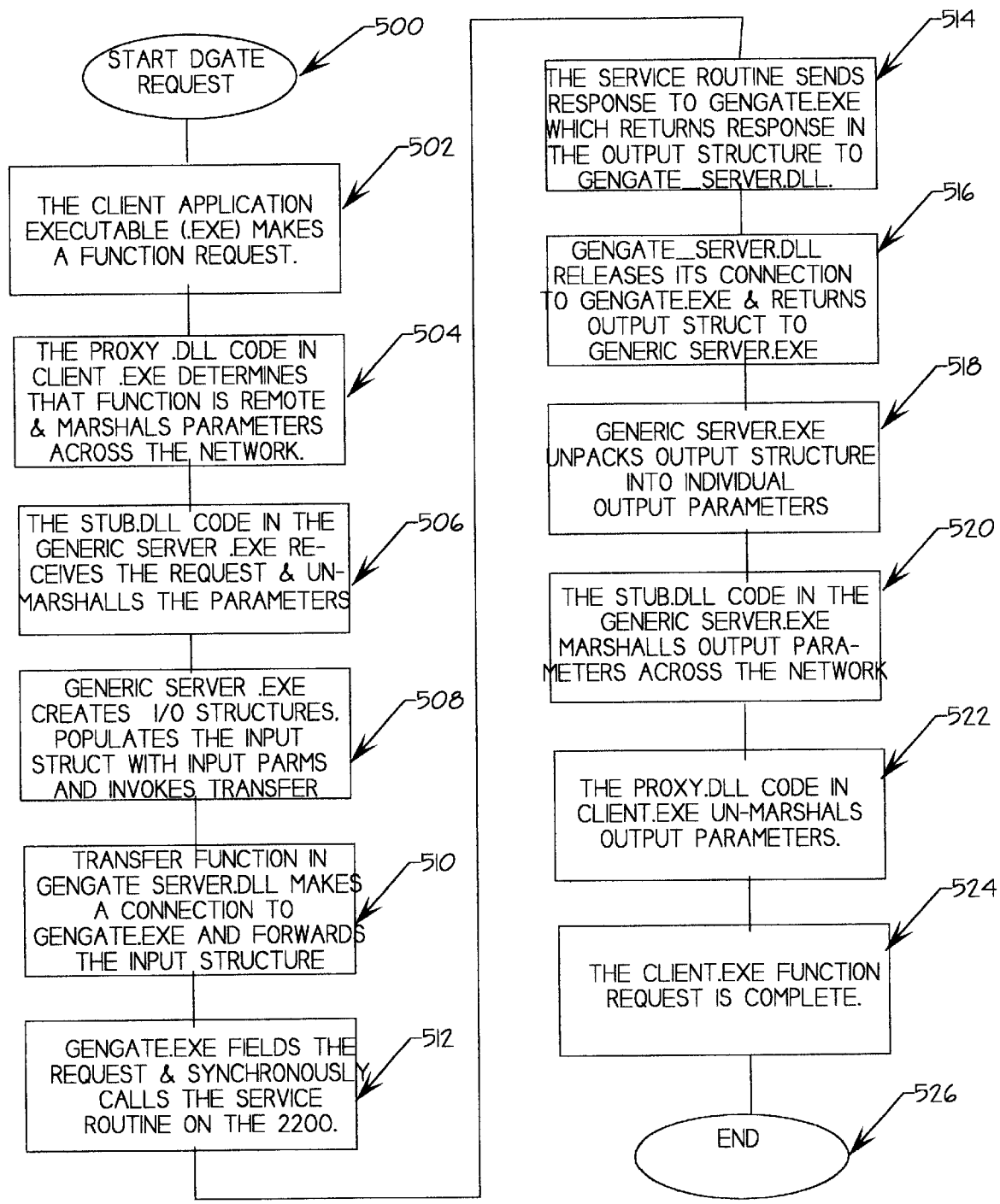
FIG. 5 is a flow diagram illustrating what happens when a request is issued by a client to an enterprise OLTP enterprise application.

FIG. 5 is a flow diagram illustrating what happens when a request is issued by a DCOM client to an enterprise OLTP enterprise application. The process begins at block 500, with the issuance of an OLTP function request from the client application executable, as shown at 502. Next, DCOM code in the client executable determines if the function is remote, and if so, it marshals parameters across the network, as shown at 504. The DCOM code accomplishes this function by converting requests from the DCOM client application to remote procedure calls.

The DCOM code in the generic server executable receives the request, then un-marshals the parameters, as shown at 506. In other words, the stub accepts remote procedure calls from object proxies on client PCs and converts them to interface calls to the generic DCOM server application.

Next, the vendor supplied code in the Generic Server.exe converts the input string to the format GdGate requires, packages up the input parameters, and initiates a transfer to the gate. The server makes a connection to the GenGate executable and forwards the input data, as shown at 510.

The GDGate executable (otherwise known as the GenGate Runtime) acts as a conduit between the DCOM environment and the Open/OLTP environment. Thus, the GenGate executable fields the request from the server and synchronously calls the service routine on the 2200 enterprise server, as shown at 512.

On the Unisys 2200, the request will first be handled by the TransIT Open/OLTP Transaction Manager, available commercially from Unisys Corporation, which is the base product for all Open/OLTP software in the OS 2200 environment. The Open/OLTP Transaction Manager includes interfaces to applications and to database systems (resource managers), including the Database Management System (DMS) and the Relational Database Management System (RDMS). The service routine on the enterprise OLTP system eventually sends a response back to the GenGate executable, which reformats the response into an output string and returns the output string to the GenDCOM_Server.exe, as shown at 514.

Next, GDGate_server.exe releases its connection to GDGate.exe and converts the data back to the format required by the client.

The DCOM code in the generic server executable then marshals the output parameters back across the network to the DCOM client, as shown at 520. Finally, the DCOM code in the client executable un-marshals the output parameters into a form that the client executable can use, as shown at 522. The client function request has now been successfully completed 524.

Figure 6:
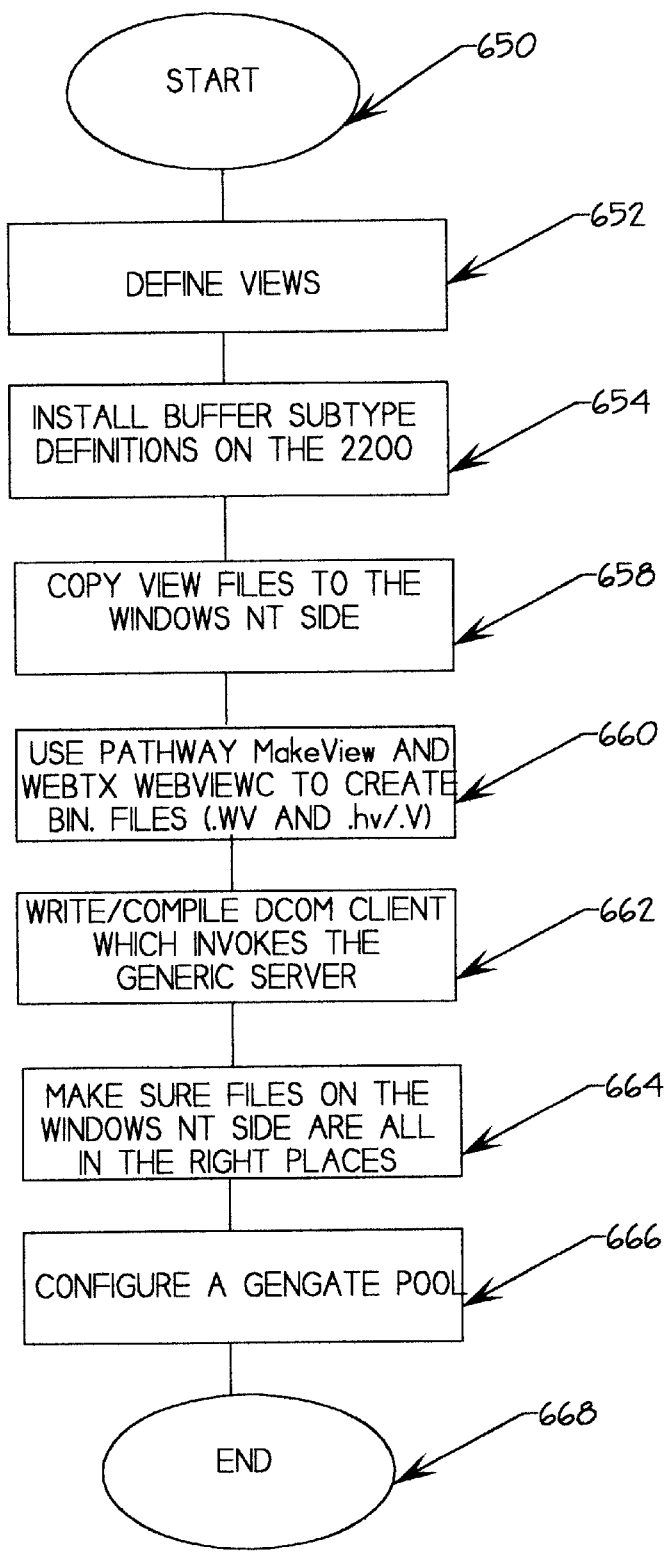
FIG. 6 is a flow diagram illustrating how to set up a DGate application.

FIG. 6 is a flow diagram illustrating how to set up a GDGate application. Beginning at 650, the first step in the process is to define the view files 652. View file definitions show input and output parameters that will be received and transmitted to/from the On-Line transaction processing system application. In particular, the view file definitions indicate where each input/output parameter is located in the buffer subtype, and the size and type of each input parameter (e.g. whether the parameter is an 80-byte character string, a long integer, etc). If a service is to provide output to the user, another output view file definition is required to communicate how the information will be presented within the output view buffer.

Next, buffer subtype definitions must be installed on the Unisys 2200 OLTP enterprise system 654. Open/OLTP users X/Open typed buffers and user-defined buffer subtypes to define data structures. These structures ensure that applications programs can successfully exchange data, even when they reside on different types of machines. Unisys OLTP-TM2200 VIEW utilities are used to define and install buffer subtypes. When the buffer subtypes and defined and installed, the Unisys On-Line Transaction Processing Transaction Manager (OLTP-TM2200) encodes and decodes the buffer data on behalf of the application programs.

Next, the view definition files which were defined on the 2200 Enterprise OLTP server are copied (via FTP, or other copy service) to the Windows NT Node 658. After the view definition files have been copied to the Windows NT node, the Pathway VIEWC and WebTx WebviewC compiler are used to generate binary files (.WV and .hV) 660.

A user must next write/compile a DCOM Client which invokes the Generic DCOM Server 662. The Generic DCOM Server is supplied by Unisys Corporation in the preferred embodiment of the present invention.

After the GenCom Client has been created, the developer must make sure that all files on the Windows NT side are all in the right places 664, and a GenGATE pool must be configured 666.

Figure 7:
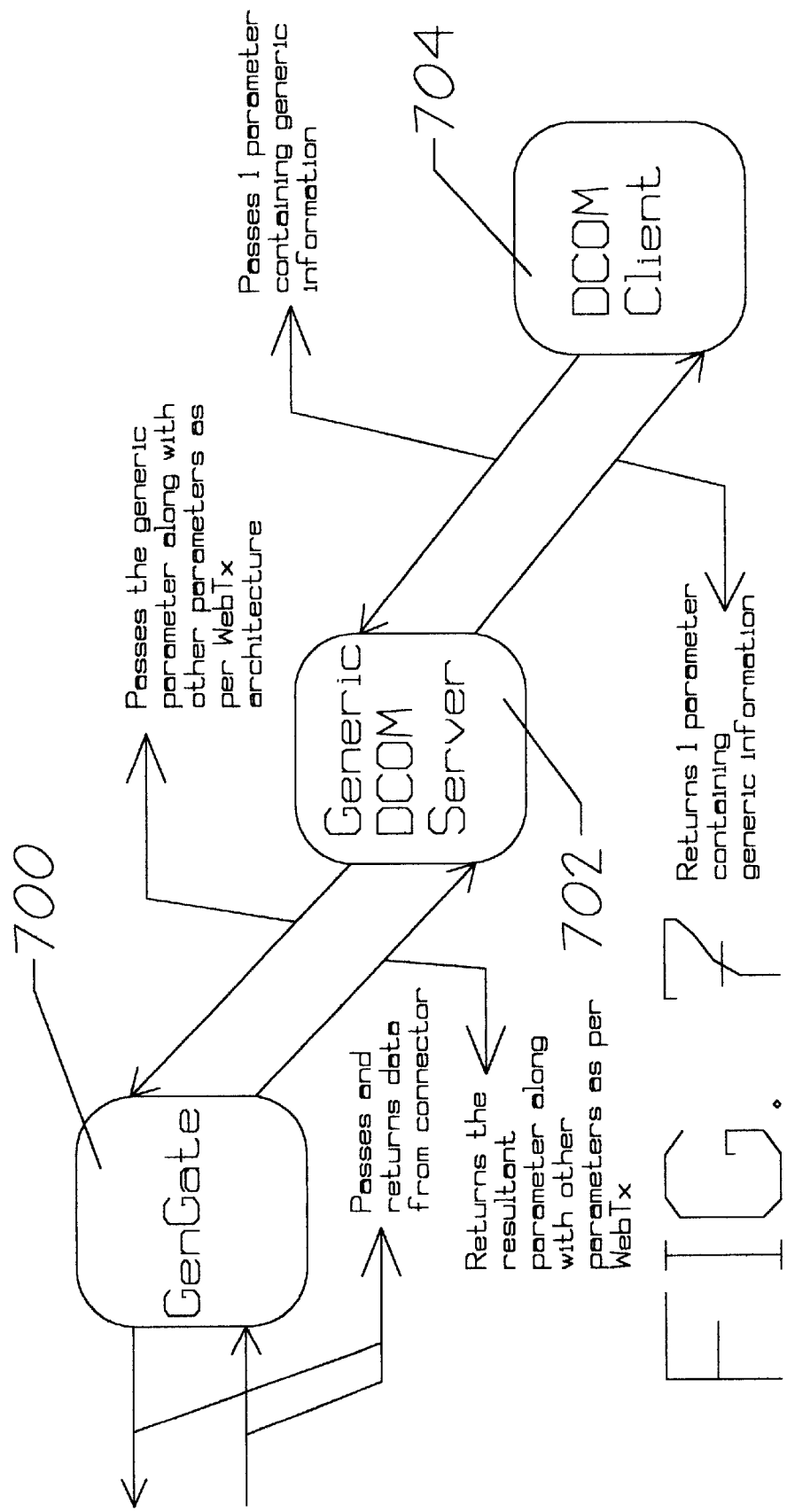
FIG. 7 is a schematic diagram showing data transfer between the gateway and Generic DCOM Server of the present invention.

FIG. 7 is a schematic diagram showing run time operation of the preferred mode of the present invention. DCOM Client 704 is generated by the client developer as described above in accordance with the transaction processing needs to be addressed. Also as described above and in accordance with the present invention, the DCOM Client developer is free to concentrate upon the specific needs of the application and to create the client in a high level fashion without undue attention to the details of the communication environment.

In operation DCOM Client 704 packages the service input information as a string of data which appears to vendor supplied Generic DCOM Server 702 as a single parameter. As a minimum, this input information must include the input view name, the input view data (in name/value pairs), and the service to be called. This string is passed as a single parameter to vendor supplied Generic DCOM Server 702 as shown.

This single parameter is received by Generic DCOM Server 702 and verified as containing the required information. Because the input to Generic DCOM Server 702 may be presented in several formats and the input to gate, GDGate 700, must be of a single specific format, Generic DCOM Server 702 makes the necessary format conversion. After format conversion, the generic parameter is passed from Generic DCOM Server 702 to GDGate 700 along with the other WebTx architectural parameters as shown. A more complete description of the WebTx architectural requirements may be found in the above referenced, commonly assigned, co-pending U.S. patent applications.

Upon receiving the input from Generic DCOM Server 702, vendor supplied GDGate 700 makes the desired service request of the OLTP system using the standardized WebTx connector protocol as shown. After the OLTP system receives the input and processes the requested service, it returns the output to GDGate 700 using standard WebTx connector protocol.

As shown, the output parameters are transferred to Generic DCOM Server 702 for packaging as a single parameter containing a string of the output data. This single parameter to transferred to DCOM Client 704.

Having thus described the preferred embodiments of the present invention, those of skill in the art will readily appreciate that the teachings found herein may be applied to yet other embodiments within the scope of the claims hereto attached.

What is claimed is:

1. In a data processing system having a Distributed Component Object Module (DCOM) environment connected to an On-Line Transaction Processing (OLTP) system, the improvement comprising:
   a. a client application generated within said DCOM environment for making a request for service from said OLTP system;
   b. a generic DCOM server responsively coupled to said client application for converting said request into a predefined format; and
   c. a generic gate responsively coupled to said generic DCOM server for receiving said request in said predefined format and making said request of said OLTP system.

2. The improvement of claim 1 wherein said DCOM environment further comprises an industry standard personal computer.

3. The improvement of claim 2 wherein said industry standard personal computer operates under an industry standard operating system.

4. The improvement of claim 3 wherein said generic gate makes said request of said OLTP system in accordance with standard WebTx connector architecture.

5. The improvement of claim 4 wherein said OLTP system further comprises Unisys 2200 system.

6. A data processing system comprising:
   a. a DCOM environment including a client for requesting a service;
   b. a generic DCOM server responsively coupled to said client;
   c. a generic gate responsively coupled to said generic DCOM server; and d. an OLTP system responsively coupled to said generic DCOM server which performs said requested service.

7. A data processing system according to claim 6 wherein said DCOM environment further comprises an industry standard personal computer.

8. A data processing system according to claim 7 wherein said DCOM environment further comprises an industry standard operating system within said industry standard personal computer.

9. A data processing system according to claim 8 wherein said generic gate is responsively coupled to said OLTP system via WebTx connector architecture.

10. A data processing system according to claim 9 wherein said OLTP system further comprises a Unisys 2200 system.

11. A data processing system comprising:
  a. means for providing a DCOM environment;
  b. means within said DCOM environment for requesting an OLTP service;
  c. means responsively coupled to said requesting means for formatting said request for said OLTP service;
  d. means responsively coupled to said formatting means for managing said request to said OLTP service; and
  e. means responsively coupled to said managing means for performing said OLTP service.

12. A data processing system according to claim 11 wherein said providing means further comprises an industry standard personal computer.

13. A data processing system according to claim 12 wherein said providing means further comprises an industry standard operating system within said industry standard personal computer.

14. A data processing system according to claim 13 wherein said managing means further comprises a generic gate operating in accordance with WebTx connector architecture.

15. A data processing system according to claim 14 wherein said performing means further comprises a Unisys 2200 system.

16. A method comprising:
  a. developing a client within a DCOM environment for requesting an OLTP service;
  b. transferring said request for said OLTP service from said client to a generic DCOM server;
  c. formatting said request for said OLTP service;
  d. transferring said formatted request for said OLTP service to a generic gate;
  e. converting said formatted request for said OLTP service to a standardized communication protocol;
  f. transmitting said converted request for said OLTP service to an OLTP system; and
  g. performing said requested service.

17. The method of claim 16 wherein said DCOM environment further comprises an industry standard personal computer.

18. The method of claim 17 wherein said DCOM environment further comprises an industry standard operating system within said industry standard operating system.

19. The method of claim 18 wherein said standardized communication protocol further comprises WebTx connector architecture.

20. The method of claim 19 wherein said OLTP system further comprises a Unisys 2200 system.

* * * * *